United States Patent
Luo et al.

(10) Patent No.: US 11,189,183 B2
(45) Date of Patent: Nov. 30, 2021

(54) INTELLIGENT VOICE INTERACTION METHOD, DEVICE AND COMPUTER READABLE STORAGE MEDIUM

(71) Applicants: BAIDU ONLINE NETWORK TECHNOLOGY (BEIJING) CO., LTD., Beijing (CN); SHANGHAI XIAODU TECHNOLOGY CO., LTD, Shanghai (CN)

(72) Inventors: Ronggang Luo, Beijing (CN); Yongshuai Lu, Beijing (CN)

(73) Assignees: BAIDU ONLINE NETWORK TECHNOLOGY (BEIJING) CO., LTD.; SHANGHAI XIAODU TECHNOLOGY CO. LTD.

(*) Notice: Subject to any disclaimer, the term of this patent is extended or adjusted under 35 U.S.C. 154(b) by 191 days.

(21) Appl. No.: 16/566,099

(22) Filed: Sep. 10, 2019

(65) Prior Publication Data
US 2020/0005659 A1    Jan. 2, 2020

(30) Foreign Application Priority Data
Oct. 25, 2018 (CN) .......................... 201811249708.5

(51) Int. Cl.
*G06F 3/16* (2006.01)
*G09B 5/04* (2006.01)
(Continued)

(52) U.S. Cl.
CPC .......... *G09B 5/04* (2013.01); *G06F 3/04883* (2013.01); *G06F 3/165* (2013.01);
(Continued)

(58) Field of Classification Search
None
See application file for complete search history.

(56) References Cited

U.S. PATENT DOCUMENTS 5,426,726 A * 6/1995 Horiuchi .............. G06T 11/203
345/467
9,495,620 B2 * 11/2016 Dolfing .............. G06K 9/00979
(Continued)

FOREIGN PATENT DOCUMENTS

CN        2570902 Y      9/2003
CN     101551724 A     10/2009
(Continued)

OTHER PUBLICATIONS

First Office Action issued in CN Patent Application No. 201711249708.5 dated Jul. 3, 2020.
(Continued)

*Primary Examiner* — Tuan S Nguyen
(74) *Attorney, Agent, or Firm* — Dilworth IP, LLC (57) ABSTRACT

Embodiments of the present disclosure provide a method, a device, and a computer readable storage medium for intelligent voice interaction. The method includes: obtaining text information or drawing information input by a user on a digitizer tablet; identifying the text information or the drawing information to obtain an identification result; and transmitting audio information corresponding to the identification result to the digitizer tablet, enabling the digitizer tablet to play the audio information. According to the embodiments of the present disclosure, the digitizer tablet performs an intelligent voice interaction with the user according to the text information or the drawing information input by the user when the user practices calligraphy or drawing, thus increasing an interactivity between the user, especially a child, with the digitizer tablet, and enhancing the child's interest in learning.

20 Claims, 6 Drawing Sheets

(51) Int. Cl.
  *G06F 3/0488* (2013.01)
  *G06K 9/00* (2006.01)
  *G09B 11/00* (2006.01)
  *G09G 5/37* (2006.01)

(52) U.S. Cl.
  CPC .......... *G06K 9/00416* (2013.01); *G09B 11/00* (2013.01); *G09G 5/37* (2013.01); *G09G 2354/00* (2013.01)

(56) References Cited

U.S. PATENT DOCUMENTS

2002/0097908 A1* 7/2002 Ohashi ................... G06K 9/036
                                                            382/187
2020/0074167 A1* 3/2020 Morwing .............. G06F 40/205

FOREIGN PATENT DOCUMENTS

| CN | 202134126 U | 2/2012 |
| CN | 103809694 A | 5/2014 |
| CN | 107944457 A | 4/2018 |
| CN | 108230818 A | 6/2018 |

OTHER PUBLICATIONS

Second Office Action in CN Patent Application No. 201811249708.5 dated Apr. 30, 2021.

* cited by examiner

FIG. 10

INTELLIGENT VOICE INTERACTION METHOD, DEVICE AND COMPUTER READABLE STORAGE MEDIUM

CROSS-REFERENCE TO RELATED APPLICATIONS

This application claims priority to Chinese Patent Application No. 201811249708.5, filed on Oct. 25, 2018, which is hereby incorporated by reference in its entirety.

TECHNICAL FIELD

Embodiments of the present disclosure relate to the field of computers, and in particular, to a method, a device, and a computer readable storage medium for intelligent voice interaction.

BACKGROUND

In existing technologies, products such as smart speakers, story machines, tablet computers, mobile phones can be used for children's study. However, the products such as tablets and mobile phones have certain influence on children's eyes, while smart speakers and story machines have no display screens and are less attractive to children, thus cannot attract children well.

Therefore, in the existing technologies, there is a lack of a product that is suitable for children's study.

SUMMARY

Embodiments of the present disclosure provide a method, a device, and a computer readable storage medium for intelligent voice interaction to provide a product suitable for children's study.

In a first aspect, an embodiment of the present disclosure provides an intelligent voice interaction method, including:

obtaining text information or drawing information input by a user on a digitizer tablet;

identifying the text information or the drawing information to obtain an identification result; and transmitting audio information corresponding to the identification result to the digitizer tablet, enabling the digitizer tablet to play the audio information.

In a second aspect, an embodiment of the present disclosure provides an intelligent voice interaction device, including:

an obtaining module, configured to obtain text information or drawing information input by a user on a digitizer tablet;

an identifying module, configured to identify the text information or the drawing information to obtain an identification result; and a transmitting module, configured to transmit audio information corresponding to the identification result to the digitizer tablet, enabling the digitizer tablet to play the audio information.

In a third aspect, an embodiment of the present disclosure provides a server, including:

a memory;
a processor;
a communication interface; and
a computer program;

where the computer program is stored in the memory and is configured to be implemented by the processor to:

obtain text information or drawing information input by a user on a digitizer tablet;

identify the text information or the drawing information to obtain an identification result; and transmit, by the communication interface, audio information corresponding to the identification result to the digitizer tablet, enabling the digitizer tablet to play the audio information.

In a fourth aspect, an embodiment of the present disclosure provides a computer readable storage medium, where the computer readable storage medium has a computer program stored thereon, and the computer program, when being executed by a processor, implements the method according to the first aspect.

According to the intelligent voice interaction method, the intelligent voice interaction device and the computer readable storage medium provided by the embodiments of the present disclosure, a digitized tablet collects text information or drawing information input by a user, and transmits the text information or the drawing information to a cloud server, where the cloud server identifies the text information or the drawing information and transmits audio information corresponding to an identification result to the digitizer tablet, so that the digitizer tablet plays the audio information, in this way, the digitizer tablet performs an intelligent voice interaction with the user according to the text information or the drawing information input by the user when the user practices calligraphy or drawing, thereby increasing an interactivity between the user, especially a child, with the digitizer tablet, and enhancing the child's interest in learning.

Specific embodiments of the present disclosure are illustrated by the above-described figures, which will be described in detail hereinafter. The drawings and the text are not intended to limit the scope of the present disclosure in any way, but to illustrate the concept of the present disclosure with reference to the specific embodiments for those of ordinary skill in the art.

DESCRIPTION OF EMBODIMENTS

Exemplary embodiments will be described in detail herein, examples of which are illustrated in the accompanying drawings. In the following description, the same numerals in different figures refer to the same or similar elements, unless otherwise indicated. The embodiments described in the following exemplary embodiments do not represent all embodiments consistent with the present disclosure. Instead, they are merely examples of devices and methods consistent with aspects of the present disclosure as described in the appended claims.

Figure 1:
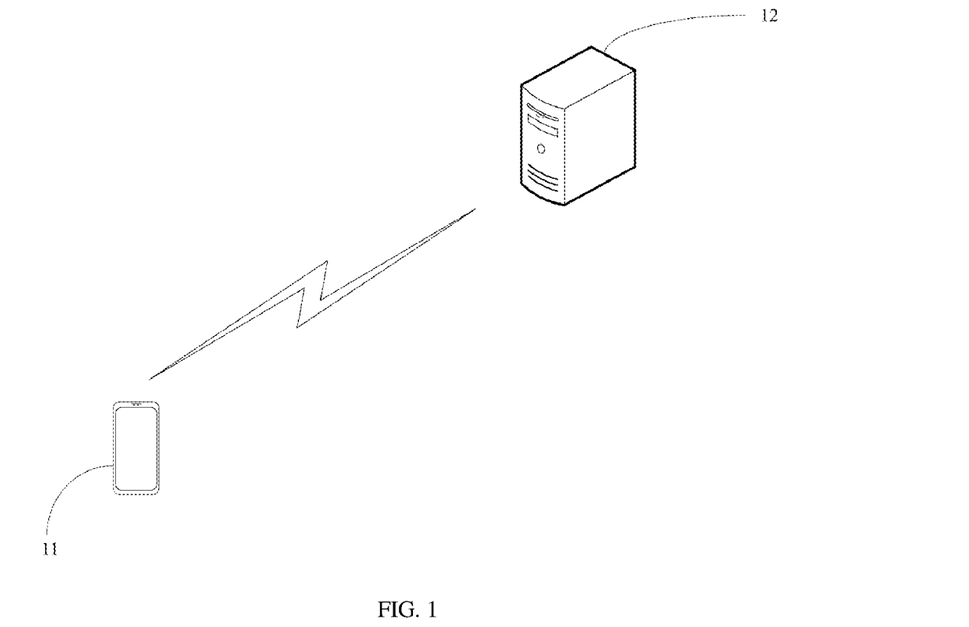
FIG. 1 is a schematic diagram of a communication system according to an embodiment of the present disclosure.
Figure 2:
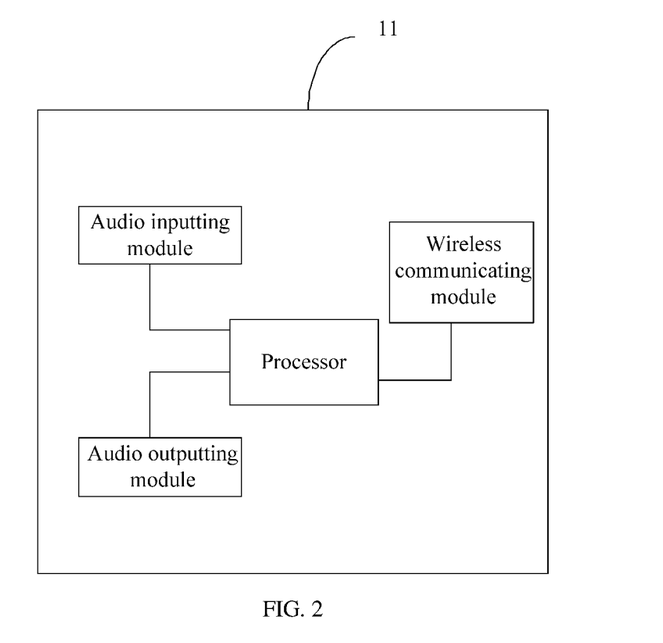
FIG. 2 is a schematic structural diagram of a digitizer tablet according to another embodiment of the present disclosure.

An intelligent voice interaction method provided by the present disclosure can be applied to a communication system shown in FIG. 1. As shown in FIG. 1, the communication system includes a digitizer tablet 11 and a cloud server 12. The display component of the digitizer tablet 11 is specifically an electronic ink screen, the electronic ink screen has characteristics such as a lower power consumption, more friendly to eyes. Further, as shown in FIG. 2, the digitizer tablet 11 includes an audio inputting module, an audio outputting module, a wireless communicating module, a processor or the like. The audio inputting module may be a microphone, and the audio outputting module may be a speaker. The wireless communicating module may be a wireless fidelity (WIFI) module. The digitizer tablet 11 can wirelessly communicate with the cloud server 12 through the wireless communicating module. In addition, in other embodiments, the digitizer tablet 11 may also include a wired communication interface, so that the digitizer tablet 11 and the cloud server 12 can perform wired communications. The microphone of the digitizer tablet 11 can convert a voice signal of a user into an electrical signal, the processor transmits the electrical signal to the cloud server 12 through the wireless communicating module, and the cloud server 12 processes the electrical signal and transmits a processing result to the digitized tablet 11, the processor of the digitizer tablet 11 plays the processing result through the audio outputting module. Specifically, an intelligent voice interaction can be performed between the user and the digitizer tablet 11. When collecting a voice signal of the user, the digitizer tablet 11 converts the voice signal into an audio signal, and transmits the audio signal to the cloud server 12, where the cloud server 12 provides an audio service for the user according to the audio signal, for example, answering a user's question or acquiring multimedia data that matches the user's needs, and transmitting the answer to the question asked by the user to the digitizer tablet 11, or transmitting the multimedia data required by the user to the digital device 11, such that the digitized tablet 11 plays the answer to the question asked by the user, or plays the multimedia data required by the user.

The present disclosure provides an intelligent voice interaction method that aims to solve the above technical problems in prior art.

The technical solution of the present disclosure and how the technical solution of the present disclosure solves the above technical problems will be described in detail below with reference to specific embodiments. The following specific embodiments may be combined with each other, and the same or similar concepts or processes may not be described again in some embodiments. The embodiments of the present disclosure will be described below with reference to the accompanying drawings.

Figure 3:
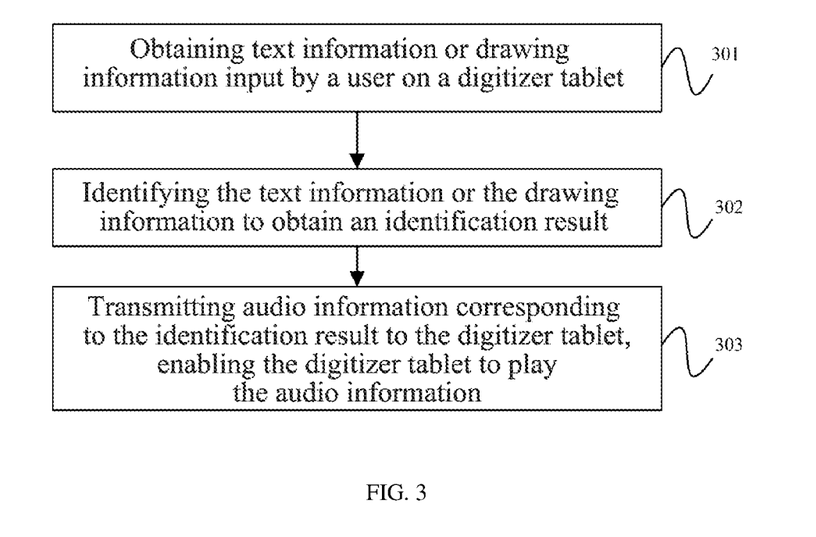
FIG. 3 is a flowchart of an intelligent voice interaction method according to an embodiment of the present disclosure.

FIG. 3 is a flowchart of an intelligent voice interaction method according to an embodiment of the present disclosure. The embodiment of the present disclosure provides the intelligent voice interaction method for solving the above technical problem in the prior art. Specific steps of the method are as follows:

Step 301: obtaining text information or drawing information input by a user on a digitizer tablet.

In the embodiment, the digitizer tablet 11 further includes a pressure sensitive pen through which the user can practice calligraphy or drawing on the digitizer tablet 11. The digitizer tablet 11 can transmit information input by the user on the digitizer tablet 11 to the cloud server 12 in real time. For example, the digitizer tablet 11 may transmit dot matrix data of each stroke of a character or a drawing that is input by the user on the digitizer tablet to the cloud server 12.

Step 302: identifying the text information or the drawing information to obtain an identification result.

After receiving the dot matrix data of each stroke that is transmitted by the digitizer tablet 11, the cloud server 12 can identify the character or the drawing input by the user on the digitizer tablet 11, for example, to identify whether a stroke order of the character written by the user is correct, whether the character written by the user is formal or standard as a whole, or to identify an object drawn by the user.

Step 303: transmitting audio information corresponding to the identification result to the digitizer tablet, enabling the digitizer tablet to play the audio information.

After identifying the character or the drawing input by the user on the digitizer tablet 11, the cloud server transmits audio information corresponding to a respective identification result to the digitizer tablet 11. For example, the cloud server 12 identifies that the stroke order of the character written by the user is correct, however, the character written by the user has a certain difference compared to a standard character, and then the cloud server 12 transmits audio information of "the stroke order is correct, the character as a whole has a certain difference compared to the standard character" to the digitizer tablet 11, so that the digitizer tablet 11 plays the audio information.

According to the embodiment of the present disclosure, a digitized tablet collects text information or drawing information input by a user, and transmits the text information or the drawing information to a cloud server, where the cloud server identifies the text information or the drawing information and transmits audio information corresponding to an identification result to the digitizer tablet, so that the digitizer tablet plays the audio information, in this way, the digitizer tablet performs an intelligent voice interaction with the user according to the text information or the drawing information input by the user when the user practices calligraphy or drawing, thereby increasing an interactivity between the user, especially a child, with the digitizer tablet, and enhancing the child's interest in learning.

Figure 4:
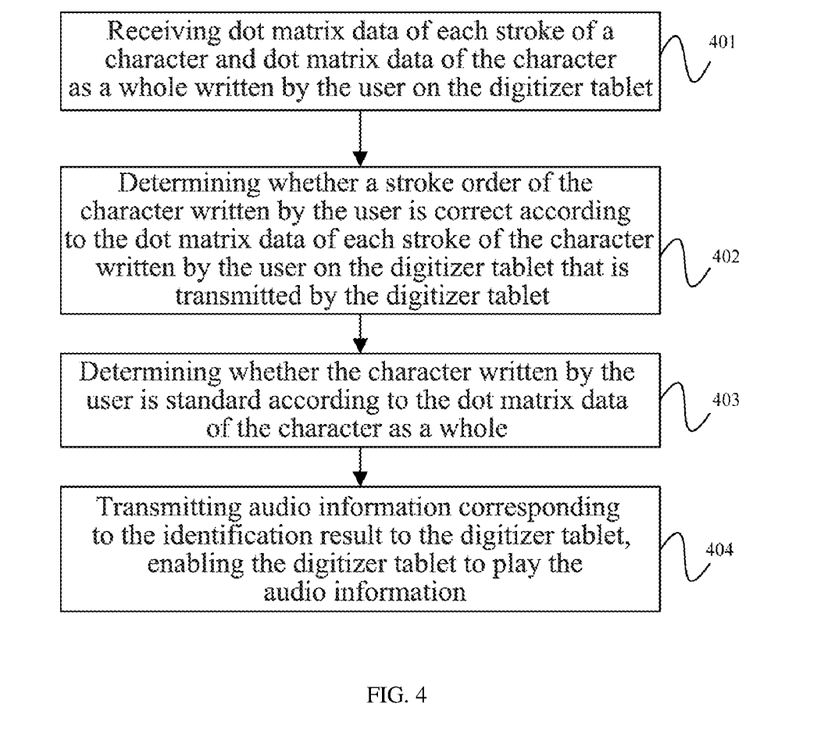
FIG. 4 is a flowchart of an intelligent voice interaction method according to another embodiment of the present disclosure.

FIG. 4 is a flowchart of an intelligent voice interaction method according to another embodiment of the present disclosure. On the basis of the foregoing embodiment, the intelligent voice interaction method provided in this embodiment specifically includes the following steps:

Step 401: receiving dot matrix data of each stroke of a character and dot matrix data of the character as a whole written by the user on the digitizer tablet.

Figure 5:
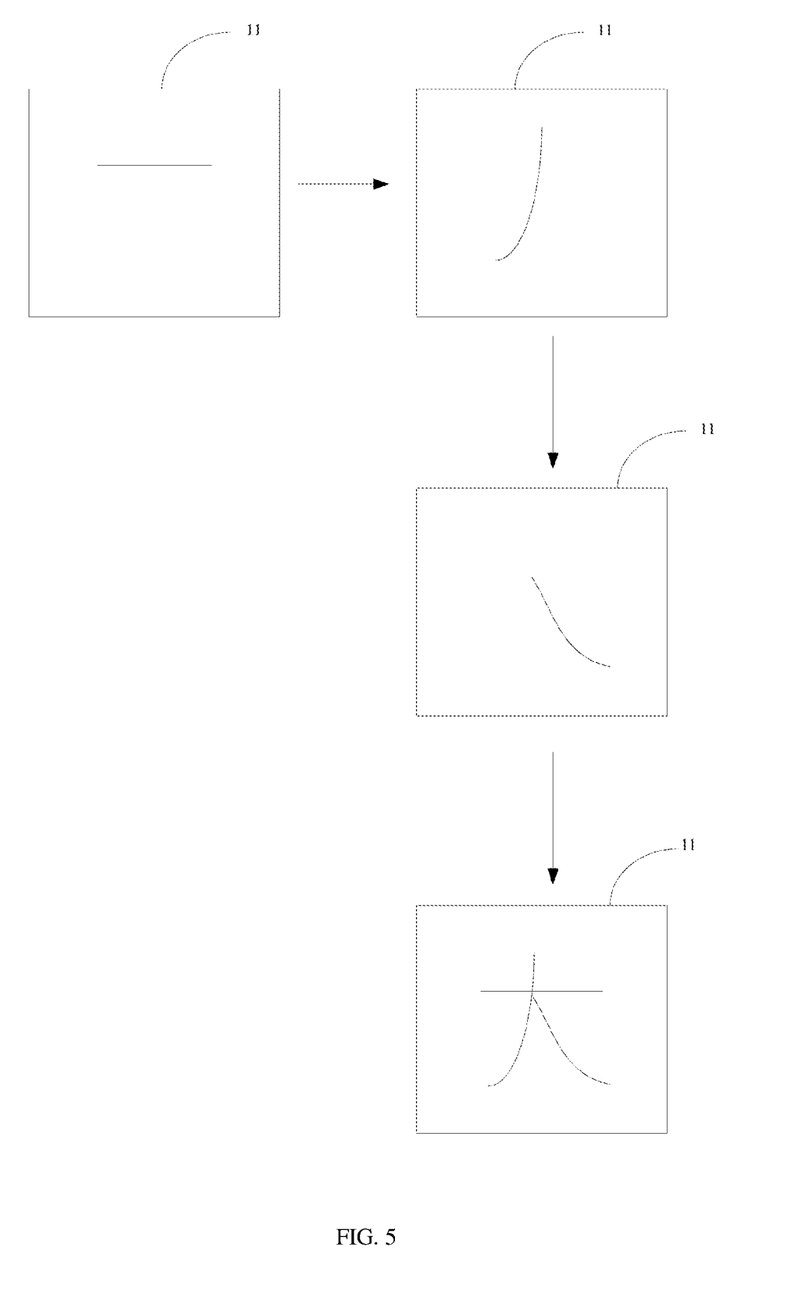
FIG. 5 is a schematic diagram of dot matrix data according to an embodiment of the present disclosure.

As shown in FIG. 5, for example, the character input by the user on the digitizer tablet 11 is a character of "大", and the digitizer tablet 11 transmits dot matrix data of a stroke to the cloud server 12 each time the stroke is written down by the user. It can be understood that when the user is writing the same stroke, a movement track of the pressure sensitive pen on the electronic ink screen of the digitizer tablet 11 is continuous, or a movement track of a cursor of the digitizer tablet 11 on the electronic ink screen is continuous. When different strokes are written by the user, the movement track of the pressure sensitive pen or the cursor on the electronic ink screen is discontinuous. For example, strokes of the character of "大" includes a "horizontal stroke (—)", a "left-falling stroke ( ノ )" and a "right-falling stroke ( ヘ )", when the user writes the "horizontal stroke (—)", a movement track of the pressure sensitive pen or the cursor on the electronic ink screen is continuous, and as the user writing the "left-falling stroke ( ノ )", the movement track of the pressure sensitive pen or the cursor on the electronic ink screen will be interrupted. Correspondingly, the digitizer tablet 11 can identify a stroke input by the user on the digitizer tablet 11 according to a movement track of the pressure sensitive pen or the cursor on the electronic ink screen. Alternatively, basic strokes of Chinese characters may be stored in the digitizer tablet 11. There are eight basic strokes of traditional Chinese characters, namely, "a dot stroke ( ˋ ), a horizontal stroke (—), a vertical stroke ( | ) a left-falling stroke ( ノ ), a right-falling stroke ( ヘ ), a turning stroke (→), a curve stroke ( ) ) and a hook stroke ( 亅 )", the digitizer tablet 11 can identify the user's input on the digitizer tablet 11 according to the movement track of the pressure sensitive pen or the cursor on the electronic ink screen, and the basic strokes of the Chinese characters.

Each time a stroke is identified by the digitizer tablet 11, the digitizer tablet 11 transmits the dot matrix data of the stroke to the cloud server 12, and also transmits dot matrix data of the entire character (the character as a whole) such as "大" to the cloud server 12. As shown in FIG. 5, the digitizer tablet 11 sequentially transmits dot matrix data of the "horizontal stroke (—)", dot matrix data of the "left-falling stroke ( ノ )", dot matrix data of the "right-falling stroke ( ヘ )", and dot matrix data of the entire character "大" composed by a "horizontal stroke (—)", a "left-falling stroke ( ノ )" and a "right-falling stroke ( ヘ )" to the cloud server 12.

Figure 6:
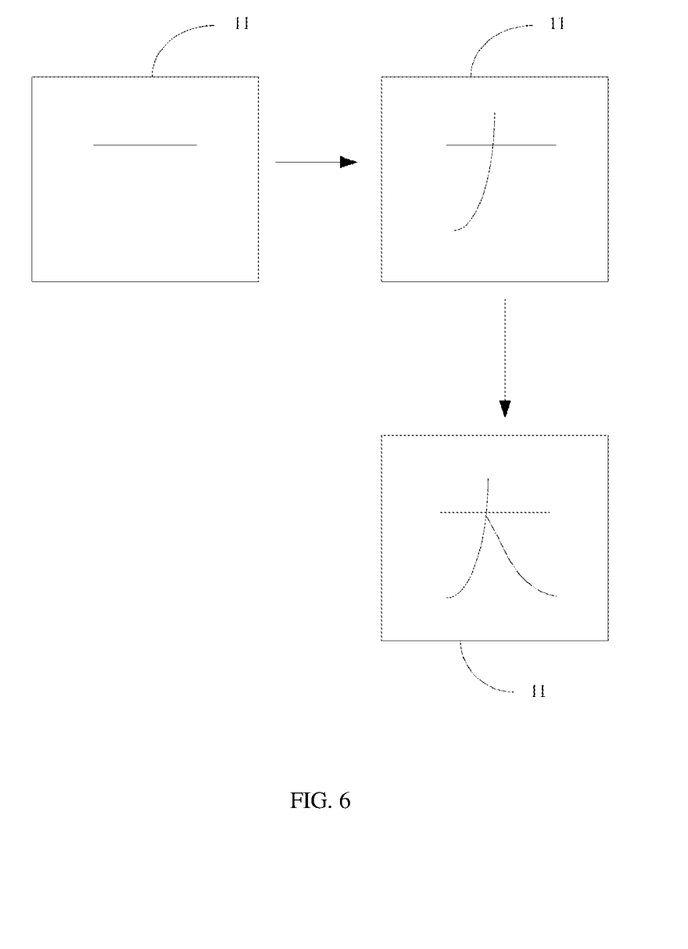
FIG. 6 is a schematic diagram of dot matrix data according to an embodiment of the present disclosure.

Alternatively, each time a stroke is identified by the digitizer tablet 11, the digitizer tablet 11 transmits dot matrix data of the stroke and dot matrix data of strokes that are previously identified to the cloud server 12, and also transmits dot matrix data of an entire character such as "大" to the cloud server 12. As shown in FIG. 6, the digitizer tablet 11 sequentially transmits dot matrix data of a "horizontal stroke (—)", dot matrix data of a "horizontal stroke (—)" and a "left-falling stroke ( ノ )", and dot matrix data of the entire character "大" composed by a "horizontal stroke (—)", a "left-falling stroke ( ノ )" and a "right-falling stroke ( ヘ )" to the cloud server 12.

Step 402: determining whether a stroke order of the character written by the user is correct according to the dot matrix data of each stroke of the character written by the user on the digitizer tablet that is transmitted by the digitizer tablet.

For example, the cloud server 12 determines whether a stroke order of the character "大" written by the user is correct according to the dot matrix data of the "horizontal stroke (—)", the dot matrix data of the "left-falling stroke ( ノ )" and the dot matrix data of the "right-falling stroke ( ヘ )" transmitted by the digitized tablet 11 sequentially.

In an embodiment, the determining whether a stroke order of the character written by the user is correct according to the dot matrix data of each stroke of the character written by the user on the digitizer tablet that is transmitted by the digitizer tablet includes: determining an image corresponding to each stroke of the character according to the dot matrix data of each stroke of the character; and comparing the image corresponding to each stroke of the character with a standard stroke image of the character to determine whether the stroke order of the character written by the user is correct.

For example, the cloud server 12 determines an image corresponding to the "horizontal stroke (—)", an image corresponding to the "left-falling stroke ( ノ )" and an image corresponding to the "right-falling stroke ( ヘ )" according to the dot matrix data of the "horizontal stroke (—)", the dot matrix data of the "left-falling stroke ( ノ )" and the dot matrix data of the "right-falling stroke ( ヘ )" transmitted by the digitized tablet 11 sequentially. In an embodiment, the cloud server 12 includes a text database, where the text database includes data such as a writing method, a stroke order, a writing method of regular script, a word meaning, a sentence, and the like of more than 20,000 Chinese characters and simple English. The cloud server 12 determines whether a stroke order of the character, for example, "大", written by the user is correct by comparing an image corresponding to each stroke written by the user with the a standard stroke image of the character of "大".

Step 403: determining whether the character written by the user is standard according to the dot matrix data of the character as a whole.

For example, the cloud server 12 identifies a character written by the user according to the dot matrix data of the entire character "大" transmitted by the digitizer tablet 11. In an embodiment, the identification may be performed by using an optical character recognition (OCR) algorithm. For example, the cloud server 12 identifies that the character written by the user is a character of "大".

Alternatively, the cloud server 12 may also transmit the dot matrix data of the entire character of "大" to another third-party server, so that the third-party server uses the OCR algorithm to identify the character written by the user. For example, the third-party server identifies that the character written by the user is "大", and the cloud server 12 further determines whether the character of "大" written by the user is standard, for example, by comparing the character of "大" written by the user with the character of "大" in regular script.

In an embodiment, the determining whether the character written by the user is standard according to the dot matrix data of the character as a whole includes: determining an image corresponding to the character according to the dot matrix data of the character as a whole; and comparing the image corresponding to the character and a standard image of the character to determine whether the character written by the user is standard.

Figure 7:
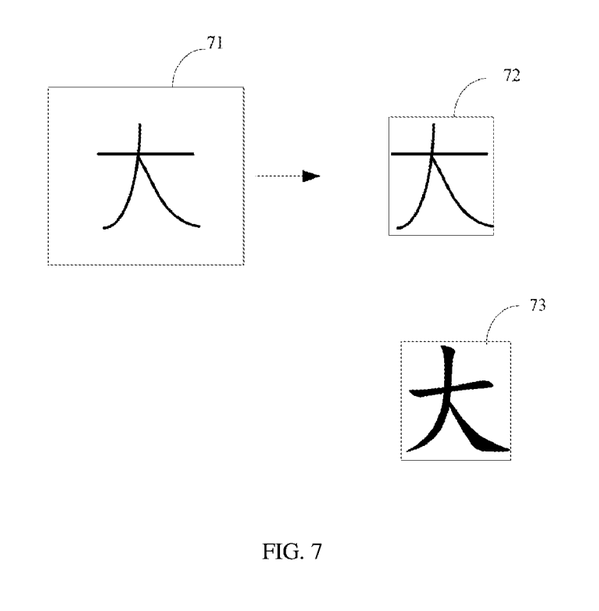
FIG. 7 is a schematic diagram of dot matrix data according to an embodiment of the present disclosure.

As shown in FIG. 7, the cloud server 12 determines an image 71 corresponding to the character of "大" according to dot matrix data of the character of "大" as a whole, and further binarizes the image 71, for example, sets a pixel value corresponding to the character of "大" to be 1, a pixel value corresponding to background to be 0 to obtain a binarized image, and the binarized image is further trimmed on edges (edge trimming) to obtain a cropped image 72. Further, the image 72 and the standard image of the character of "大", for example, a regular script image 73, are compared. Specifically, difference values between pixel points of the same positions in the image 72 and the image 73 can be compared. Thus, it can be determined whether the character of "大" written by the user is standard. Alternatively, the image 72 and the image 73 are of the same size. If the image 72 that is obtained by edge trimming the image 71 is different in size from the image 73, the size of the image 72 can be scaled accordingly so that the sizes of the image 72 and the image 73 are the same.

Step 404: transmitting audio information corresponding to the identification result to the digitizer tablet, enabling the digitizer tablet to play the audio information.

As shown in FIG. 5 or 6, the cloud server 12 determines that the stroke order of the character of "大" written by the user is correct, but as shown in FIG. 7, the character of "大" written by the user is not standard enough. The cloud server 12 transmits corresponding audio information to the digitizer tablet 11, and the digitizer tablet 11 plays the audio information. For example, the digitizer tablet 11 plays: "The one you wrote is a character of '大', the stroke order is correct, but the script is not beautiful enough, it needs to be strong and powerful." After hearing the audio information played by the digitizer tablet 11, the user further modifies and adjusts the writing script to write a beautiful character of "大".

According to the embodiment of the present disclosure, a digitized tablet collects text information input by a user, and transmits the text information to a cloud server, where the cloud server identifies the text information to identify whether a stroke order written by the user is correct and whether the written script is standard, and transmits audio information corresponding to an identification result to the digitizer tablet, so that the digitizer tablet plays the audio information, in this way, the digitizer tablet performs an intelligent voice interaction with the user according to the text information input by the user when the user practices calligraphy, increasing the writing scripts.

Figure 8:
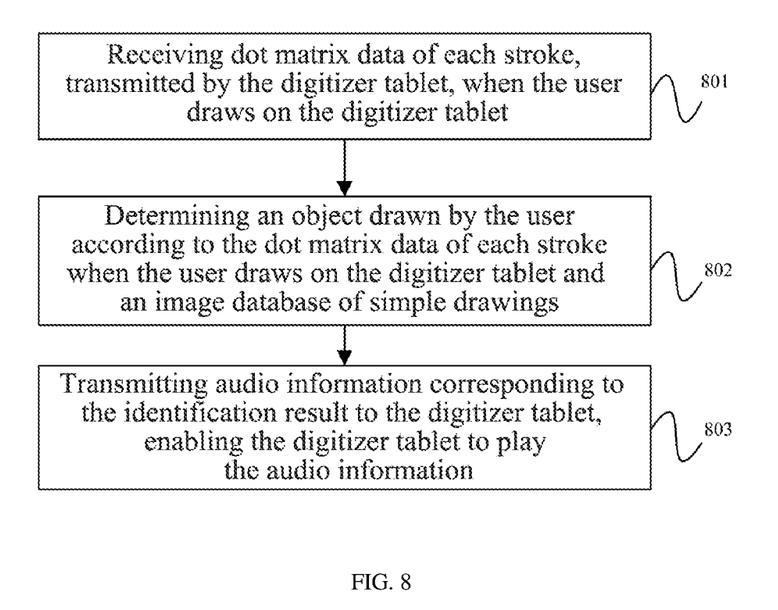
FIG. 8 is a flowchart of an intelligent voice interaction method according to another embodiment of the present disclosure.

FIG. 8 is a flowchart of an intelligent voice interaction method according to another embodiment of the present disclosure. On the basis of the foregoing embodiments, the intelligent voice interaction method provided in this embodiment specifically includes the following steps:

Step 801: receiving dot matrix data of each stroke, transmitted by the digitizer tablet, when the user draws on the digitizer tablet.

In this embodiment, the digitizer tablet 11 can further propose a simple drawing task to the user, for example, the digitizer tablet 11 broadcasts that: "Now, let's start drawing a boat." The user starts drawing on the digitizer tablet 11, and each time a stroke is drawn, the digitized tablet 11 transmits dot matrix data of the stroke to the cloud server 12.

Step 802: determining an object drawn by the user according to the dot matrix data of each stroke when the user draws on the digitizer tablet and an image database of simple drawings.

In this embodiment, the cloud server 12 further stores an image database of simple drawings, which stores images of simple drawings of more than 2000 kinds of objects, for example, images of simple drawings of an object such as a television, an electric fan, a bicycle, or an apple. And each object can have more than 100 images of simple drawings.

After the cloud server 12 receives the dot matrix data of each stroke drawn by the user on the digitizer tablet 11 that is transmitted by the digitizer tablet 11, the cloud server determines an object drawn by the user according to the dot matrix data and the image database of simple drawings.

In an embodiment, the determining an object drawn by the user according to the dot matrix data of each stroke when the user draws on the digitizer tablet and an image database of simple drawings includes: determining a drawing image according to the dot matrix data of each stroke when the user draws on the digitizer tablet; and identifying the drawing image through a neural network model pre-trained by the image database of simple drawings to determine the object drawn by the user.

For example, the cloud server 12 may pre-train the neural network model by using images of simple drawings in the image database of simple drawings to obtain a trained neural network model, where the neural network model may specifically be a deep residual network model. After the cloud server 12 receives the dot matrix data of each stroke drawn by the user on the digitizer tablet 11 that is transmitted by the digitizer tablet 11, the cloud server 12 determines a drawing image formed by the current stroke according to the dot matrix data of each stroke of the user, and identifies the drawing image by using the trained deep residual network model to identify the object drawn by the user.

Step 803: transmitting audio information corresponding to the identification result to the digitizer tablet, enabling the digitizer tablet to play the audio information.

For example, if the cloud server 12 identifies that the object drawn by the user is not a boat but a brick, the cloud server 12 may transmit audio information to the digitizer tablet 11, and the digitizer tablet 11 plays the audio information, for example, the digitizer tablet 11 plays: "I think you are drawing a brick."

In addition, if the cloud server 12 determines that the object drawn by the user does not conform to the simple drawing task proposed by the digitizer tablet 11 to the user, the cloud server 12 may also transmit an image of a simple drawing that is requested by the digitizer tablet 11 to the user, for example, an image of a simple drawing of a boat, to the digitizer tablet 11, so that the user can re-draw a boat in accordance with the image of the simple drawing of the boat.

If the cloud server 12 identifies that the object drawn by the user is a small boat, the cloud server 12 can transmit audio information to the digitizer tablet 11 to give the user a compliment and start a new task, for example, the digitizer tablet 11 plays: "Good job, the boat you drawn is great. Let's move on to the next one. Let's start drawing a computer."

In an embodiment, during writing or drawing, the user may also have a voice interaction with the digitizer tablet. For example, the user asks the digitizer tablet: "How is the weather today?" The digitizer tablet can convert the voice signal from the user to an audio signal, and transmits the audio signal to the cloud server, the cloud server acquires weather information of the area to which the digitizer tablet belongs according to positioning information of the digitizer tablet, and transmits the weather information to the digitizer tablet, and the digitizer tablet broadcasts the current weather information in the form of audio playing, that is, the digitizer tablet has a function as a smart speaker. In addition, the digitizer tablet can also transmit characters or drawings input by the user to other terminal devices such as computers, mobile phones, tablets, and the like.

According to the embodiment of the present disclosure, a digitized tablet collects drawing information input by a user, and transmits the drawing information to a cloud server, where the cloud server identifies the drawing information to identify an object drawn by the user and transmits audio information corresponding to an identification result to the digitizer tablet, so that the digitizer tablet plays the audio information, in this way, the digitizer tablet performs an intelligent voice interaction with the user according to the drawing information input by the user when the user draws on the digitized tablet, thus increasing the user's interest in painting.

Figure 9:
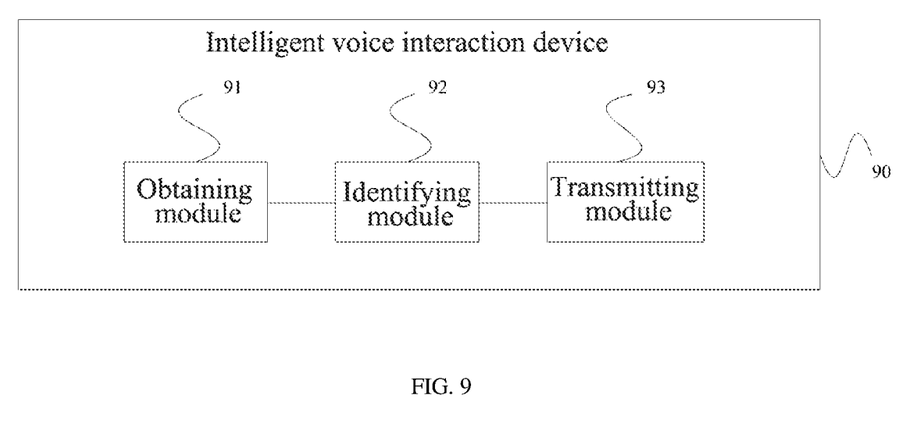
FIG. 9 is a schematic structural diagram of an intelligent voice interaction device according to an embodiment of the present disclosure.

FIG. 9 is a schematic structural diagram of an intelligent voice interaction device according to an embodiment of the present disclosure. The intelligent voice interaction device may be the cloud server in the above embodiments or a component in the cloud server. The intelligent voice interaction device provided by the embodiment of the present disclosure can perform the process flow provided by the embodiments of the intelligent voice interaction method. As shown in FIG. 9, the intelligent voice interaction device 90 includes an obtaining module 91, an identifying module 92, and a transmitting module 93. The obtaining module 91 is configured to obtain text information or drawing information input by a user on a digitizer tablet; the identifying module 92 is configured to identify the text information or the drawing information to obtain an identification result; and the transmitting module 93 is configured to transmit audio information corresponding to the identification result to the digitizer tablet, enabling the digitizer tablet to play the audio information.

In an embodiment, the obtaining module 91 is specifically configured to receive dot matrix data of each stroke of a character and dot matrix data of the character as a whole written by the user on the digitizer tablet.

In an embodiment, the identifying module 92 is specifically configured to determine whether a stroke order of the character written by the user is correct according to the dot matrix data of each stroke of the character written by the user on the digitizer tablet that is transmitted by the digitizer tablet; and determine whether the character written by the user is standard according to the dot matrix data of the character as a whole.

In an embodiment, when the identifying module 92 determines whether a stroke order of the character written by the user is correct according to the dot matrix data of each stroke of the character written by the user on the digitizer tablet that is transmitted by the digitizer tablet, the identifying module 92 is specifically configured to determine an image corresponding to each stroke of the character according to the dot matrix data of each stroke of the character; and compare the image corresponding to each stroke of the character with a standard stroke image of the character to determine whether the stroke order of the character written by the user is correct.

In an embodiment, when the identifying module 92 determines whether the character written by the user is standard according to the dot matrix data of the character as a whole, the identifying module 92 is specifically configured to determine an image corresponding to the character according to the dot matrix data of the character as a whole; and compare the image corresponding to the character and a standard image of the character to determine whether the character written by the user is standard.

In an embodiment, the obtaining module 91 is specifically configured to receive dot matrix data of each stroke, transmitted by the digitizer tablet, when the user draws on the digitizer tablet.

In an embodiment, the identifying module 92 is specifically configured to determine an object drawn by the user according to the dot matrix data of each stroke when the user draws on the digitizer tablet and an image database of simple drawings.

In an embodiment, when the identifying module 92 determines an object drawn by the user according to the dot matrix data of each stroke when the user draws on the digitizer tablet and an image database of simple drawings, the identifying module 92 is specifically configured to determine a drawing image according to the dot matrix data of each stroke when the user draws on the digitizer tablet; and identify the drawing image through a neural network model pre-trained by the image database of simple drawings to determine the object drawn by the user.

The intelligent voice interaction device of the embodiment shown in FIG. 9 can be used to implement the technical solution of the foregoing method embodiments, and the implementation principles and technical effects are similar, therefore details are not described herein again.

Figure 10:
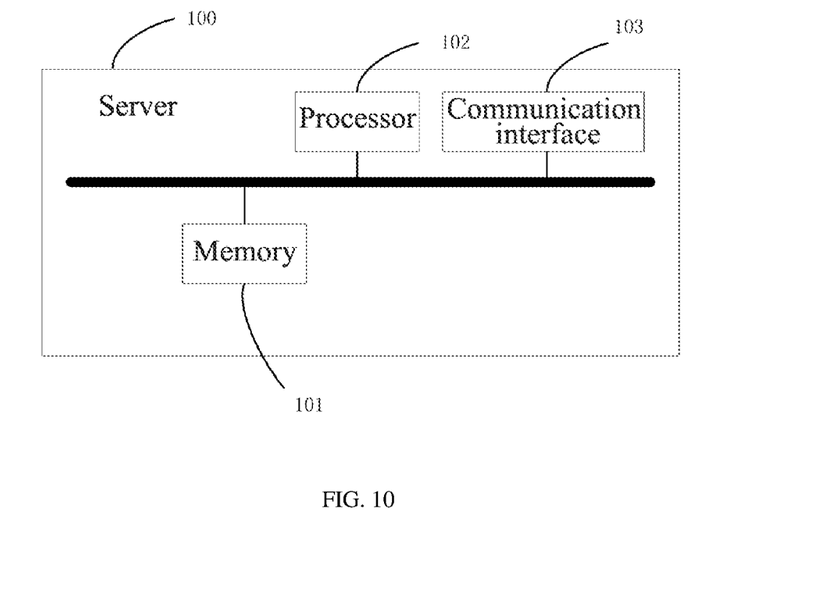
FIG. 10 is a schematic structural diagram of a server according to an embodiment of the present disclosure.

FIG. 10 is a schematic structural diagram of a server according to an embodiment of the present disclosure. The server may specifically be the cloud server in the above embodiments. The server provided by the embodiment of the present disclosure can execute the processing flow provided by the embodiments of the intelligent voice interaction method. As shown in FIG. 10, the server 100 includes a memory 101, a processor 102, a computer program, and a communication interface 103. The computer program is stored in the memory 101 and is configured to be implemented by the processor 102 to obtain text information or drawing information input by a user on a digitizer tablet; identify the text information or the drawing information to obtain an identification result; and transmit, by the communication interface, audio information corresponding to the identification result to the digitizer tablet, enabling the digitizer tablet to play the audio information.

In an embodiment, when the processor 102 obtains text information input by the user on the digitizer tablet, the processor is specifically configured to receive dot matrix data of each stroke of a character and dot matrix data of the character as a whole written by the user on the digitizer tablet through the communication interface 103.

In an embodiment, when the processor 102 identifies the text information to obtain the identification result, the processor 102 is specifically configured to determine whether a stroke order of the character written by the user is correct according to the dot matrix data of each stroke of the character written by the user on the digitizer tablet that is transmitted by the digitizer tablet; and determine whether the character written by the user is standard according to the dot matrix data of the character as a whole.

In an embodiment, when the processor 102 determines whether the stroke order of the character written by the user is correct according to the dot matrix data of each stroke of the character written by the user on the digitizer tablet that is transmitted by the digitizer tablet, the processor 102 is specifically configured to: determine an image corresponding to each stroke of the character according to the dot matrix data of each stroke of the character; and compare the image corresponding to each stroke of the character with a standard stroke image of the character to determine whether the stroke order of the character written by the user is correct.

In an embodiment, when the processor 102 determines whether the character written by the user is standard according to the dot matrix data of the character as a whole, the processor 102 is specifically configured to: determine an image corresponding to the character according to the dot matrix data of the character as a whole; and compare the image corresponding to the character and a standard image of the character to determine whether the character written by the user is standard.

In an embodiment, when the processor 102 obtains the drawing information input by the user on the digitizer tablet, the processor 102 is specifically configured to receive dot matrix data of each stroke that is transmitted by the digitizer tablet through the communication interface 103 when the user draws on the digitizer tablet.

In an embodiment, when the processor 102 identifies the drawing information to obtain the identification result, the processor 102 is specifically configured to determine an object drawn by the user according to the dot matrix data of each stroke when the user draws on the digitizer tablet and an image database of simple drawings.

In an embodiment, when the processor 102 determines the object drawn by the user according to the dot matrix data of each stroke when the user draws on the digitizer tablet and the image database of simple drawings, the processor 102 is specifically configured to determine a drawing image according to the dot matrix data of each stroke when the user draws on the digitizer tablet; and identify the drawing image through a neural network model pre-trained by the image database of simple drawings to determine the object drawn by the user.

The server of the embodiment shown in FIG. 10 can be used to implement the technical solution of the foregoing method embodiments, and the implementation principles and the technical effect are similar, therefore details are not described herein again.

In addition, the embodiment further provides a computer readable storage medium having a computer program stored thereon, where the computer program, when being executed by a processor, implements the intelligent voice interaction method described in the foregoing embodiments.

In the several embodiments provided by the present disclosure, it should be understood that the disclosed device and method may be implemented in other manners. For example, the device embodiments described above are merely illustrative. For example, the division of units is only a division of logical functions. In actual implementation, there may be other division manners, for example, multiple units or components may be combined or integrated into another system, or some features can be ignored or not executed. In addition, the mutual coupling or direct coupling or communicative connection shown or discussed may be an indirect coupling or communicative connection via some interfaces, devices or units, and may be in an electrical, mechanical or other form.

The units described as separate components may or may not be physically separated, and the components displayed as units may or may not be physical units, that is, they may be located in one site, or may be distributed across multiple network units. Some or all of the units may be selected according to actual needs to serve the purpose of the solution of the embodiments.

In addition, each functional unit in each embodiment of the present disclosure may be integrated into a processing unit, or may be presented as each unit that are separated physically, or two or more units may be integrated into one unit. The above integrated units may be implemented in the form of hardware or in the form of hardware plus software functional units.

The above integrated units implemented in the form of software functional units may be stored in a computer readable storage medium. The software functional unit described above is stored in a storage medium and includes instructions for causing a computer device (which may be a personal computer, a server, or a network device, etc.) or a processor to perform part of the steps of the methods described in various embodiments of the present disclosure. The foregoing storage medium includes medium that is capable of storing program codes, such as a USB flash disc, a mobile hard disk, a read-only memory (ROM), a random access memory (RAM), a magnetic disk, or a compact disk, and the like.

Those of ordinary skill in the art should understand that for the purpose of convenience and brevity, the division of each functional module described above is illustrative. In practical applications, the above functions may be assigned to different functional modules for implementation as needed, that is, the internal structure of the device is divided into different functional modules to perform all or part of the functions described above. For the specific working process of the device described above, reference may be made to the corresponding process in the foregoing method embodiments, and details are not repeated herein.

At last, it should be noted that the above embodiments are merely illustrative of the technical solutions of the present disclosure, and are not intended to be limiting. Although the present disclosure has been described in detail with reference to the foregoing embodiments, those skilled in the art will understand that the technical solutions described in the foregoing embodiments may be modified, or that some or all of the technical features may be equivalently substituted; these modifications or substitutions do not deviate the nature of the corresponding technical solution from the scope of the technical solutions of various embodiments according to the present disclosure.

What is claimed is:

1. An intelligent voice interaction method, comprising:
    obtaining text information or drawing information input by a user on a digitizer tablet;
    identifying the text information or the drawing information to obtain an identification result; and
    transmitting audio information corresponding to the identification result to the digitizer tablet, enabling the digitizer tablet to play the audio information, wherein the audio information comprises whether a stroke order of a character written by the user is correct, or whether an object drawn by the user meets a drawing requirement proposed by the digitizer tablet to the user.

2. The method according to claim 1, wherein the obtaining text information input by a user on a digitizer tablet comprises:
    receiving dot matrix data of each stroke of the character and dot matrix data of the character as a whole written by the user on the digitizer tablet.

3. The method according to claim 2, wherein the identifying the text information to obtain an identification result comprises:
    determining whether a stroke order of the character written by the user is correct according to the dot matrix data of each stroke of the character written by the user on the digitizer tablet that is transmitted by the digitizer tablet; and
    determining whether the character written by the user is standard according to the dot matrix data of the character as a whole.

4. The method according to claim 3, wherein the determining whether a stroke order of the character written by the user is correct according to the dot matrix data of each stroke of the character written by the user on the digitizer tablet that is transmitted by the digitizer tablet comprises:
    determining an image corresponding to each stroke of the character according to the dot matrix data of each stroke of the character; and
    comparing the image corresponding to each stroke of the character with a standard stroke image of the character to determine whether the stroke order of the character written by the user is correct.

5. The method according to claim 3, wherein the determining whether the character written by the user is standard according to the dot matrix data of the character as a whole comprises:
  determining an image corresponding to the character according to the dot matrix data of the character as a whole; and
  comparing the image corresponding to the character and a standard image of the character to determine whether the character written by the user is standard.

6. The method according to claim 1, wherein the obtaining drawing information input by a user on a digitizer tablet comprises:
  receiving dot matrix data of each stroke, transmitted by the digitizer tablet, when the user draws on the digitizer tablet.

7. The method according to claim 6, wherein the identifying the drawing information to obtain an identification result comprises:
  determining the object drawn by the user according to the dot matrix data of each stroke when the user draws on the digitizer tablet and an image database of simple drawings.

8. The method according to claim 7, wherein the determining an object drawn by the user according to the dot matrix data of each stroke when the user draws on the digitizer tablet and an image database of simple drawings comprises:
  determining a drawing image according to the dot matrix data of each stroke when the user draws on the digitizer tablet; and
  identifying the drawing image through a neural network model pre-trained by the image database of simple drawings to determine the object drawn by the user.

9. A server, comprising:
  a memory;
  a processor;
  a communication interface; and
  a computer program;
  wherein the computer program is stored in the memory and is configured to be implemented by the processor to:
  obtain text information or drawing information input by a user on a digitizer tablet;
identify the text information or the drawing information to obtain an identification result; and
  transmit, by the communication interface, audio information corresponding to the identification result to the digitizer tablet, enabling the digitizer tablet to play the audio information, wherein the audio information comprises whether a stroke order of a character written by the user is correct, or whether an object drawn by the user meets a drawing requirement proposed by the digitizer tablet to the user.

10. The server according to claim 9, wherein when the processor obtains text information input by the user on the digitizer tablet, the processor is configured to:
  receive dot matrix data of each stroke of the character and dot matrix data of the character as a whole written by the user on the digitizer tablet through the communication interface.

11. The server according to claim 10, wherein when the processor identifies the text information to obtain the identification result, the processor is configured to:
  determine whether a stroke order of the character written by the user is correct according to the dot matrix data of each stroke of the character written by the user on the digitizer tablet that is transmitted by the digitizer tablet; and
  determine whether the character written by the user is standard according to the dot matrix data of the character as a whole.

12. The server according to claim 11, wherein when the processor determines whether the stroke order of the character written by the user is correct according to the dot matrix data of each stroke of the character written by the user on the digitizer tablet that is transmitted by the digitizer tablet, the processor is configured to:
  determine an image corresponding to each stroke of the character according to the dot matrix data of each stroke of the character; and
  compare the image corresponding to each stroke of the character with a standard stroke image of the character to determine whether the stroke order of the character written by the user is correct.

13. The server according to claim 11, wherein the processor determines whether the character written by the user is standard according to the dot matrix data of the character as a whole, the processor is configured to:
  determine an image corresponding to the character according to the dot matrix data of the character as a whole; and
  compare the image corresponding to the character and a standard image of the character to determine whether the character written by the user is standard.

14. The server according to claim 9, wherein when the processor obtains the drawing information input by the user on the digitizer tablet, the processor is configured to:
  receive dot matrix data of each stroke that is transmitted by the digitizer tablet through the communication interface when the user draws on the digitizer tablet.

15. The server according to claim 14, wherein when the processor identifies the drawing information to obtain the identification result, the processor is configured to:
  determine the object drawn by the user according to the dot matrix data of each stroke when the user draws on the digitizer tablet and an image database of simple drawings.

16. The server according to claim 15, wherein when the processor determines the object drawn by the user according to the dot matrix data of each stroke when the user draws on the digitizer tablet and the image database of simple drawings, the processor is configured to:
  determine a drawing image according to the dot matrix data of each stroke when the user draws on the digitizer tablet; and
  identify the drawing image through a neural network model pre-trained by the image database of simple drawings to determine the object drawn by the user.

17. A non-transitory computer readable storage medium, wherein the non-transitory computer readable storage medium has a computer program stored thereon, and the computer program, when being executed by a processor, implements the following steps:
  obtaining text information or drawing information input by a user on a digitizer tablet;
  identifying the text information or the drawing information to obtain an identification result; and
  transmitting audio information corresponding to the identification result to the digitizer tablet, enabling the digitizer tablet to play the audio information, wherein the audio information comprises whether a stroke order of a character written by the user is correct, or whether an object drawn by the user meets a drawing requirement proposed by the digitizer tablet to the user.

18. The non-transitory computer readable storage medium according to claim 17, wherein the obtaining text information input by a user on a digitizer tablet comprises:

receiving dot matrix data of each stroke of the character and dot matrix data of the character as a whole written by the user on the digitizer tablet.

19. The method according to claim 8, wherein the neural network model comprises a deep residual network model.

20. The method according to claim 1, wherein the drawing information is input by the user in response to a drawing task proposed by the digitizer tablet.

* * * * *